(12) United States Patent
Abro et al.

(10) Patent No.: US 7,513,550 B1
(45) Date of Patent: Apr. 7, 2009

(54) VEHICLE CONSOLE MOUNTING BRACKET

(75) Inventors: Lauren M. Abro, Farmington Hills, MI (US); Charan Singh Lota, Canton, MI (US); Akihiro Deshimaru, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/937,526

(22) Filed: Nov. 9, 2007

(51) Int. Cl.
*B60R 27/00* (2006.01)
(52) U.S. Cl. .................................................. 296/24.34
(58) Field of Classification Search ............... 296/24.34, 296/37.1, 37.8; 248/222.51
See application file for complete search history.

(56) References Cited

U.S. PATENT DOCUMENTS

| | | | |
|---|---|---|---|
| 4,097,012 A | 6/1978 | McIntyre | |
| 4,522,081 A | 6/1985 | Mackin et al. | |
| 4,783,110 A | 11/1988 | Beukema et al. | |
| 5,106,143 A | 4/1992 | Soeters | |
| 5,462,146 A * | 10/1995 | Doolittle et al. | 192/218 |
| 5,957,526 A * | 9/1999 | Gramer | 296/204 |
| 6,267,217 B1 | 7/2001 | Malone et al. | |
| 6,843,521 B1 * | 1/2005 | Oana | 296/70 |
| 7,175,203 B2 | 2/2007 | Scheib | |
| 7,195,095 B2 * | 3/2007 | Oana | 180/315 |
| 7,222,906 B2 * | 5/2007 | Sakakibara et al. | 296/37.8 |
| 2007/0181763 A1 * | 8/2007 | Babian | 248/300 |

FOREIGN PATENT DOCUMENTS

JP 02296060 A 12/1990

* cited by examiner

*Primary Examiner*—H Gutman
(74) *Attorney, Agent, or Firm*—Gifford, Krass, Sprinkle, Anderson & Citkowski, P.C.

(57) ABSTRACT

An inverted U-shaped bracket for mounting a vehicle console to the vehicle floor where the vehicle console has already been attached to a pair of side console panels, the bracket having a pair of distal end portions and a back portion, the back portion being disposed between the distal end portions. The back portion having an embossment disposed opposite a bead. Each distal end portion has an oblong aperture. The oblong apertures are greater in diameter than the diameter of a rigid shaft such that the bracket can shift along the width and height of the vehicle. The bracket allows the vehicle console to be positioned flush to the vehicle floor and fixed to that desired position by absorbing any deviation or gaps between the vehicle console and the floor. The bracket absorbs the deviation and gap by bending at the bead and shifting within the space allotted between the oblong aperture and rigid shaft.

6 Claims, 4 Drawing Sheets

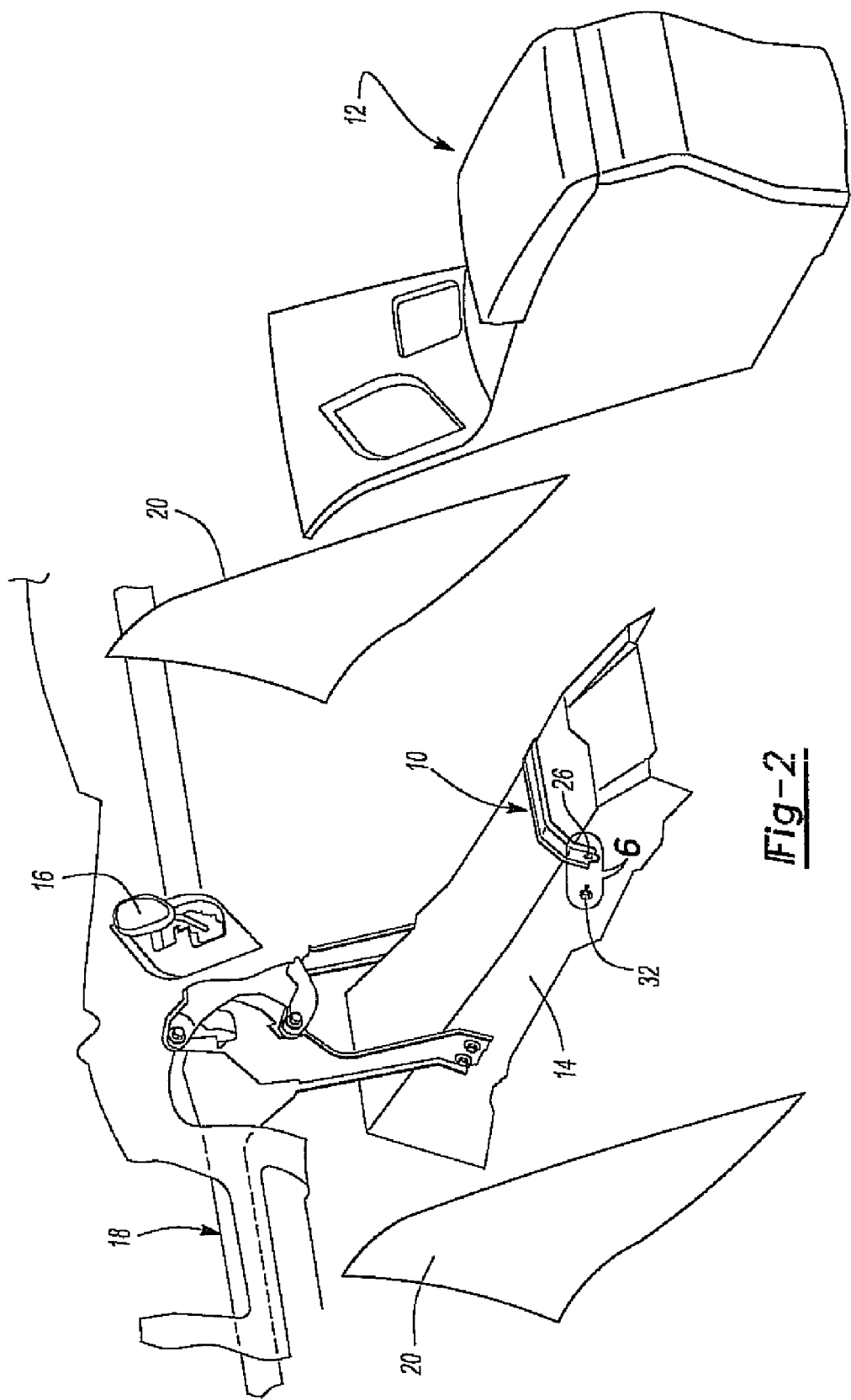

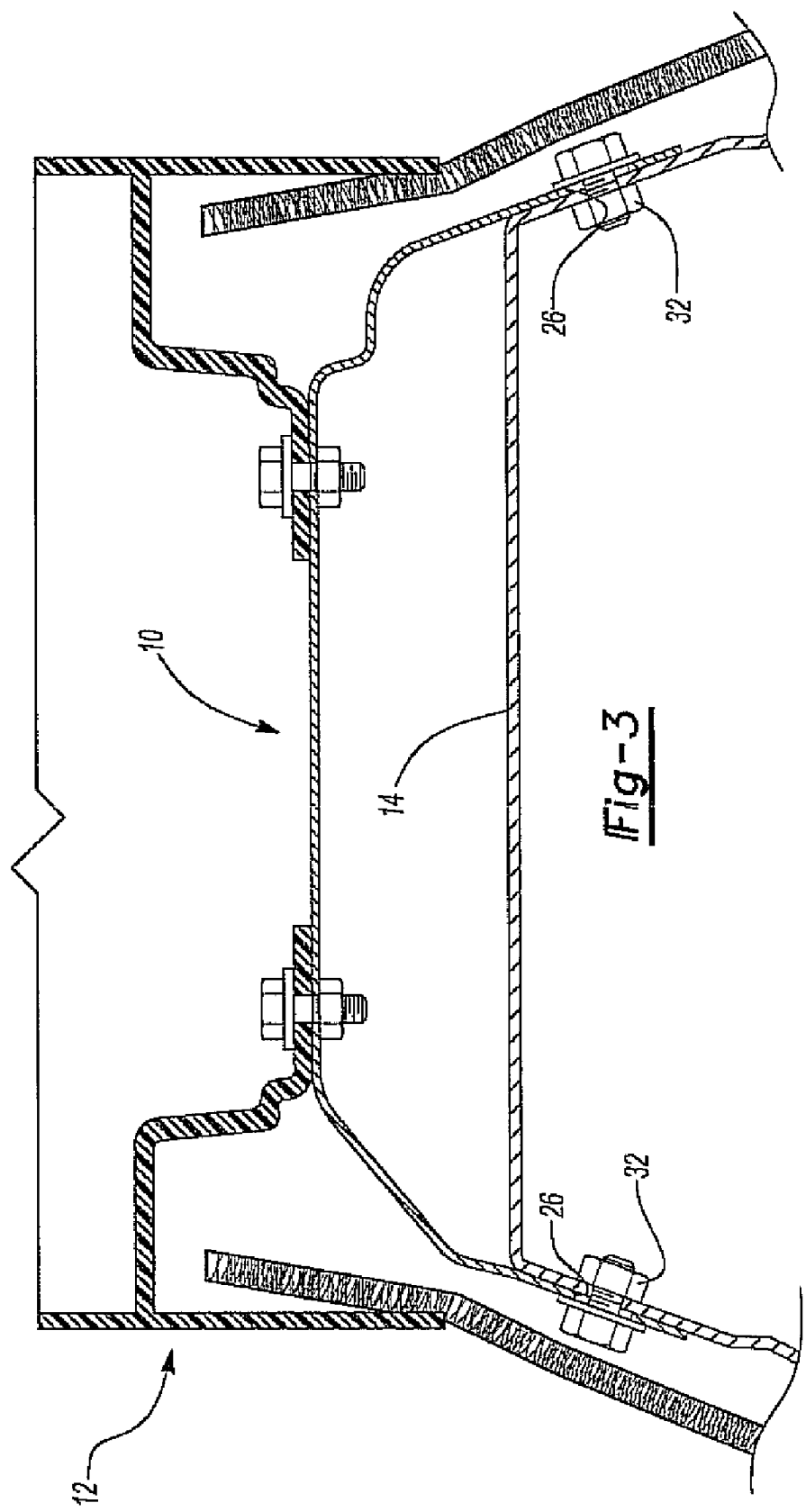

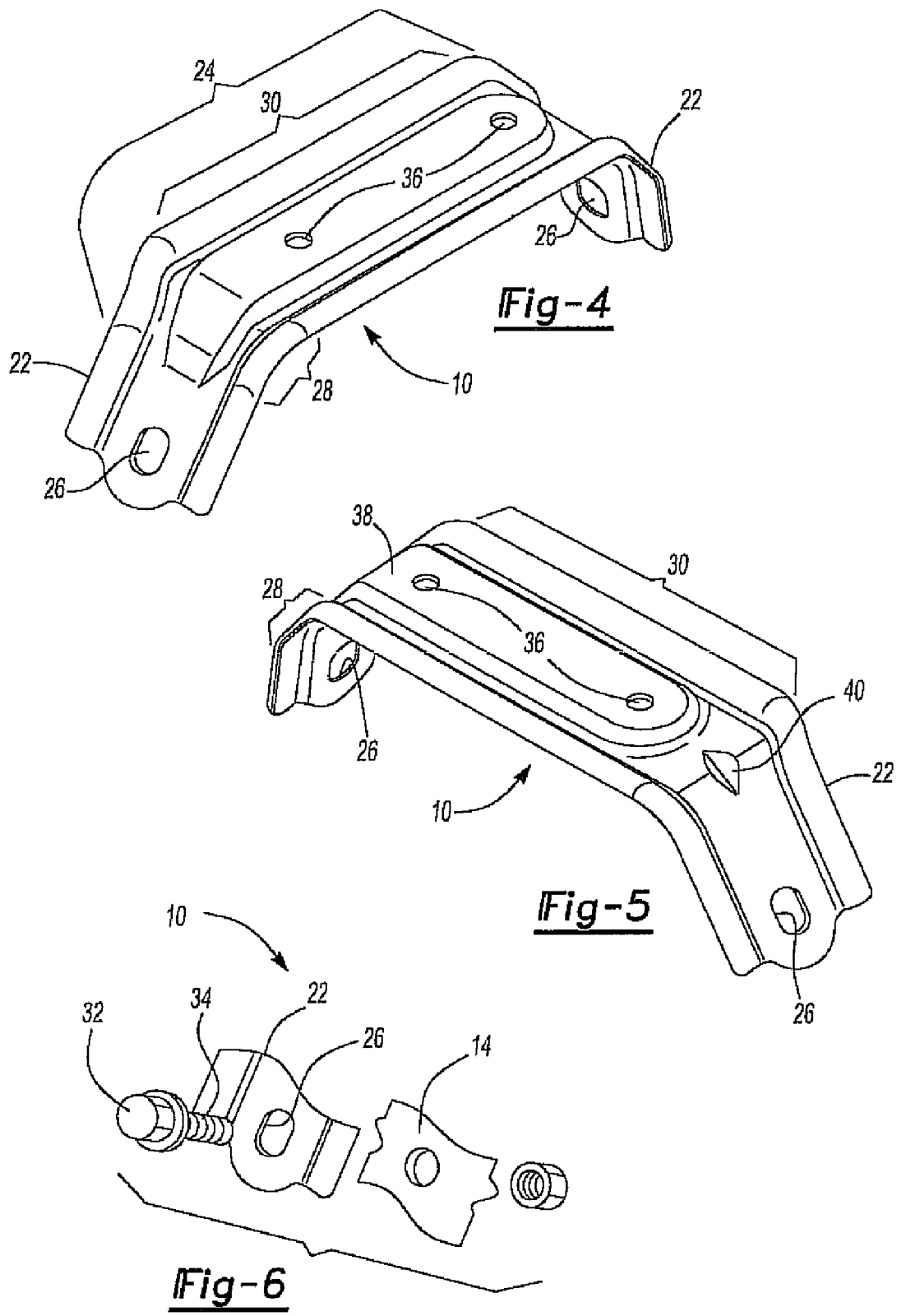

VEHICLE CONSOLE MOUNTING BRACKET

BACKGROUND OF THE INVENTION

I. Field of the Invention

A bracket for mounting a vehicle console having gear shifter fixed to an instrument panel reinforcement to a raised portion of a floor panel of a motor vehicle using a fastening device having a rigid shaft, the rigid shaft having a predetermined diameter.

II. Description of Material Art

The brackets of the type to which the subject invention pertains, are rigid and provide insufficient tolerance for adjusting the placement of a vehicle console. One such bracket is shown in U.S. Pat. No. 7,185,937 to Sakakibara wherein the bracket is formed from two Z-shaped portions, each Z-shaped portion having an upper planar surface member. One upper planar surface member of the Z-shaped portion is disposed in an overlapping relationship with the other upper planar surface member of the Z-shaped portion. The bracket is capable of adjustment along the width of the vehicle by sliding the Z-shaped portions until the desired width is achieved. The bracket works in conjunction with a pair of rails to provide tolerance along the length of the vehicle. Although this bracket and rail system provides tolerance along the width and length of the vehicle, no tolerance is provided along the height of the vehicle. However, a popular vehicle design, as seen in the Toyota Sienna, is one where the gear shifter is fixed to the instrument panel reinforcement. In such designs the gear shifter is fixed to the instrument panel reinforcement and a pair of side console panels is also mounted to the instrument panel reinforcement. The side console panels cover each exposed sides of the instrument panel reinforcement for aesthetic purposes. Each side console panel is fitted with slots at the exposed edge, and the front of the vehicle console is fitted with corresponding datum tabs so that the vehicle console may be attached to the side console panels at the exposed edge.

Imprecision in tooling may leave a gap between the bottom vehicle console and the vehicle floor, and the vehicle console may be skewed from the desired alignment upon attachment of the vehicle console to the side console panels. Accordingly, brackets of the prior art present a problem where the car manufacture desires to ensure that the console remains flush to the vehicle floor as conventional brackets do not allow for tolerance along the height of the vehicle. Furthermore, brackets of the prior art are used in conjunction with other elements to provide the tolerance need to ensure that the vehicle console is fitted in a desirable manner, and it is desirable from a cost savings perspective to have one bracket that allows for tolerance in a plurality of directions.

SUMMARY OF THE PRESENT INVENTION

The present invention provides a bracket for mounting a vehicle console to a raised portion of the floor of a motor vehicle which overcomes the problems of previously known brackets.

In brief, the bracket of the present invention is a U-shaped bracket comprising a pair of distal end portions with a support portion and strengthening portion disposed in between, forming a U-shape. The distal end portions each have an oblong aperture, and the oblong aperture is wider in diameter than the predetermined diameter of a rigid shaft of a corresponding fastening device. The oblong aperture is oriented such that the longest portion of the aperture extends from a center line of the terminal end of the distal end portion towards the support portion. The bracket is also fitted with an embossment and a bead disposed opposite each other. The embossment is disposed and extends along the strengthening portion and support portion. The bead is disposed at an edge formed where the support member abuts one of the distal end portions. The bead serves to weaken that edge and thus allows for the abutting end portion to flex.

In order to position the vehicle console flush to the vehicle floor, and achieve the desired alignment, the bracket absorbs any gap or deviation created when the vehicle console is mounted to the side console panels by having the bracket flex at the bead, and shift within the space allotted between the rigid shaft of the side fastening device and the oversized apertures.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is an exploded view of FIG. 1.

FIG. 3 is a cross-sectional view of FIG. 2 taken along line 2-2 showing the vehicle console attached to the vehicle floor using the bracket.

FIG. 4 is a perspective of an embossment having a plurality of apertures and an oblong aperture disposed on a distal end of the disclosed bracket.

FIG. 5 is a perspective of the side of the disclosed bracket showing a bead, a portion of an embossment, and an oblong aperture.

FIG. 6 is an exploded view of a distal end of the bracket showing an oblong aperture and a fastening device.

DETAILED DESCRIPTION OF A PREFERRED EMBODIMENT OF THE PRESENT INVENTION

Figure 1:
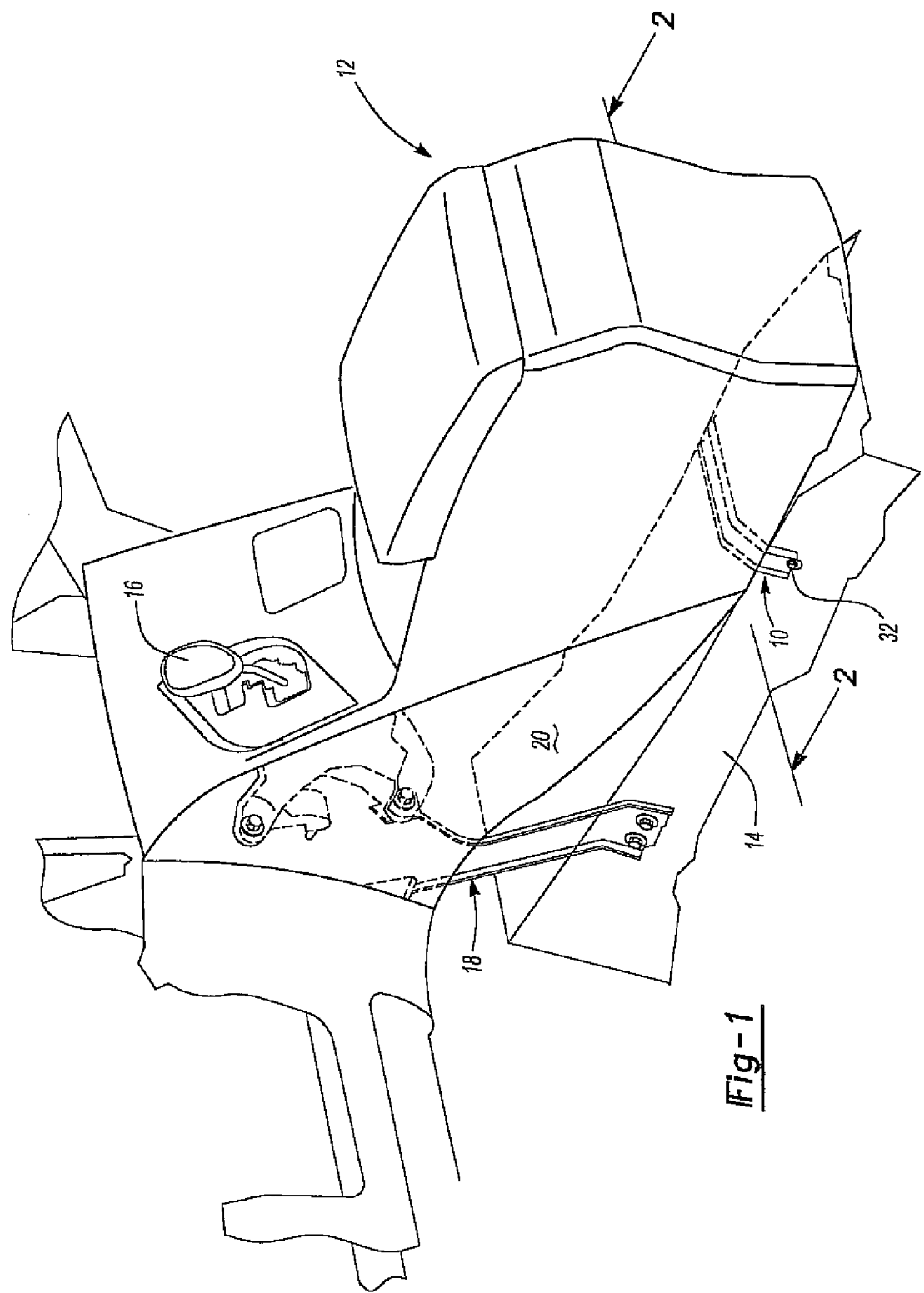
FIG. 1 is a perspective of an interior of a vehicle showing an instrument panel reinforcement, a gear shifter, side console panels, a vehicle console, and the disclosed bracket. The gear shifter and side console panels are attached to the instrument panel reinforcement, and the vehicle console is attached to the vehicle floor by the bracket.

Referring to the Figures, wherein like numerals indicate corresponding parts throughout the several views, a bracket 10 for mounting a vehicle console 12 to a raised portion of a floor 14 panel in a motor vehicle having a gear shifter 16 fixed to an instrument panel reinforcement 18. In such vehicle console 12 arrangements, the gear shifter 16 is first mounted to the instrument panel reinforcement 18, and a pair of side console panels 20 having slots for receiving the gear shifter 16 is then placed over the gear shifter 16 and secured to the instrument panel reinforcement 18 such that the side console panels 20 provide an aesthetically pleasing cover surrounding the gear shifter 16. The side console panels 20 have slots to allow the gear shifter 16 to protrude through, and datum slots for receiving a vehicle console 12. The vehicle console 12 is then mounted to the side console panels 20 and later fixed to the vehicle floor 14 by a bracket 10. The bracket 10 is U-shaped and has a pair of distal end portions 22 with a back portion 24 disposed in between. The distal end portions 22 each have an oblong aperture 26. The back portion 24 may be further defined by a strengthening portion 28 and support portion 30. The bracket 10 is generally planar, with an arcuate edge extending along each side. The bracket 10 may be molded or stamped and it is anticipated that the bracket 10 may be made from many different materials ranging from metal to hardened plastic resin. A fastening device 32 with a rigid shaft 34 is used to secure the bracket 10 to the vehicle floor 14. The fastening devices 32 are inserted into the oblong apertures 26. Many different fastening devices 32 can be used in conjunction with the oblong apertures 26 so long as the diameter of the rigid shaft 34 is less than the diameter of the oversized aperture 36 to allow for the bracket 10 to shift therein.

The bracket 10 has an embossment 38 for added strength along a bent portion of the bracket 10. The embossment 38 is disposed upon and extends along the strengthening portion 28 and the support portion 30. The embossment 38 may be fitted with a plurality of apertures 36 for securing the vehicle console 12 to the upper planar surface of the raised vehicle floor 14. These apertures 36 may be of different size and shape in order to accommodate the receipt of the vehicle console 12. An illustration of such apertures 36 can be seen in FIGS. 1 and 2.

The bracket 10 also has a bead 40 opposite the embossment 38 to allow the other bent portion of the bracket 10 to flex. The bead 40 is disposed at an edge formed where the support portion 30 abuts one of the distal end portions 22. The bead 40 is an indentation and provides a flexing point for the bracket 10 by weakening bracket 10 the edge referred above. A number of beads 40 can be disposed along the edge depending upon the amount of flexibility desired to be achieved. Furthermore, the bead 40 can be molded in various shapes. Though a diamond shaped bead 40 is shown in FIG. 2, it is anticipated that the bead 40 can also be circular, trapezoidal, oval, etc.

Thus, the bracket 10 allows for the vehicle console 12 to be positioned flush to the vehicle floor 14 and achieve the desired alignment after the vehicle console 12 has been attached to the side console panels 20. As previously described, tooling imprecision may leave a gap between the bottom of the vehicle console 12 and the floor 14 of the motor vehicle, and may also cause the vehicle console 12 to be skewed after the vehicle console 12 is mounted to the side console panels 20. The bracket 10 absorbs the gap and allows the vehicle console 12 to be aligned properly by flexing at the bead 40, and shifting within the space allotted between the rigid shaft 34 of the fastening device 32 and the oblong apertures 26.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

ELEMENT LIST

| Element Symbol | Element Name |
| --- | --- |
| 10 | bracket |
| 12 | vehicle console |
| 14 | floor |
| 16 | gear shifter |
| 18 | instrument panel reinforcement |
| 20 | side console panel |
| 22 | distal end portions |
| 24 | back portion |
| 26 | oblong aperture |
| 28 | strengthening portion |
| 30 | support portion |
| 32 | fastening device |
| 34 | rigid shaft |
| 36 | apertures |
| 38 | emboss |
| 40 | bead |

What is claimed is:

1. A bracket for mounting a vehicle console to a raised portion of the floor in a motor vehicle having a gear shifter fixed to the instrument panel reinforcement using a fastening device having a rigid shaft, the rigid shaft having a predetermined diameter, the bracket comprising:

a pair of distal end portions with a back portion disposed between each distal end portion forming a U-shape, the pair of distal end portions each having an oblong aperture, the bracket also having an embossment and a bead disposed opposite each other, and wherein the oblong aperture is wider in diameter than the predetermined diameter of the rigid shaft of the fastening device such that the vehicle console can be mounted flush to the vehicle floor by having the bracket flex at the bead, and shift within the space allotted between the rigid shaft of the fastening device and the oblong apertures.

2. The bracket as set forth in claim 1 wherein the bracket is generally planar, with an arcuate edge extending along each side.

3. The bracket as set forth in claim 1 wherein the back portion has a strengthening portion and support portion disposed between the distal end portions.

4. The bracket as set forth in claim 3 wherein the oblong apertures are disposed adjacent to the terminal end of the distal end portions, the oblong apertures being oriented such that the longest portion of the oblong aperture extends from adjacent the terminal edge of the distal end portion to proximate the support portion.

5. The bracket as set forth in claim 4 wherein the embossment is disposed and extends along on the strengthening portion and the support portion of the back portion, the embossment having a plurality of apertures for mounting the vehicle console to the vehicle floor.

6. A bracket for mounting a vehicle console to a raised portion of the floor in a motor vehicle having a gear shifter fixed to the instrument panel reinforcement using a fastening device having a rigid shaft, the rigid shaft having a predetermined diameter, the bracket comprising;

a pair of distal end portions, a back portion, an embossment for strengthening the bracket, and a bead for providing a flex point, the distal and portion each having an oblong aperture, the bead is disposed opposite the embossment of the bracket, the bracket being generally planar, with an arcuate edge extending along each side, the back portion having a strengthening portion and a support portion, the back portion being disposed between the each distal end portions forming a U-shape, the embossment is disposed along the strengthening portion and the support portion, the embossment having a plurality of apertures for securing a vehicle console to the vehicle floor, the bead is disposed where one of the distal end portion abuts the support portion and provides flexibility to the bracket, and the oblong aperture is wider in diameter than the predetermined diameter of the rigid shaft of the fastening device such that the vehicle console can be mounted flush to the vehicle floor by having the bracket flex at the bead, and shift within the space allotted between the rigid shaft of the fastening device and the oblong apertures.

* * * * *

UNITED STATES PATENT AND TRADEMARK OFFICE
CERTIFICATE OF CORRECTION

| | | |
|---|---|---|
| PATENT NO. | : 7,513,550 B1 | Page 1 of 1 |
| APPLICATION NO. | : 11/937526 | |
| DATED | : April 7, 2009 | |
| INVENTOR(S) | : Lauren M. Abro et al. | |

It is certified that error appears in the above-identified patent and that said Letters Patent is hereby corrected as shown below:

Column 1, line 44 replace "manufacture" with --manufacturer--

Column 4, line 47 replace "and" with --end--

Signed and Sealed this

Twenty-third Day of June, 2009

JOHN DOLL
*Acting Director of the United States Patent and Trademark Office*